United States Patent
Thakkar et al.

(10) Patent No.: US 9,553,887 B2
(45) Date of Patent: Jan. 24, 2017

(54) VIRTUAL MACHINE COMPLIANCE CHECKING IN CLOUD ENVIRONMENTS

(71) Applicant: VMware, Inc., Palo Alto, CA (US)

(72) Inventors: Sachin Thakkar, San Jose, CA (US);
Serge Maskalik, Los Gatos, CA (US);
Debashis Basak, San Jose, CA (US);
Allwyn Sequeira, Saratoga, CA (US);
Govind Haridas, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 217 days.

(21) Appl. No.: 14/582,464

(22) Filed: Dec. 24, 2014

(65) Prior Publication Data
US 2016/0105456 A1    Apr. 14, 2016

Related U.S. Application Data (60) Provisional application No. 62/063,264, filed on Oct. 13, 2014.

(51) Int. Cl.
| | |
|---|---|
| *G06F 15/173* | (2006.01) |
| *H04L 29/06* | (2006.01) |
| *H04L 29/08* | (2006.01) |
| *G06F 21/53* | (2013.01) |
| *G06F 21/62* | (2013.01) |

(52) U.S. Cl.
CPC .......... *H04L 63/1433* (2013.01); *G06F 21/53* (2013.01); *G06F 21/6236* (2013.01); *H04L 63/1408* (2013.01); *H04L 67/1097* (2013.01)

(58) Field of Classification Search
CPC ............. H04L 63/1433; H04L 63/1408; H04L 67/1097; G06F 21/563
See application file for complete search history.

(56) References Cited

U.S. PATENT DOCUMENTS

| | | | | |
|---|---|---|---|---|
| 8,893,258 B2* | 11/2014 | Rao | ......................... | H04L 63/08 709/227 |
| 2009/0300607 A1* | 12/2009 | Ferris | ................... | G06F 9/45558 718/1 |
| 2012/0089972 A1* | 4/2012 | Scheidel | ............. | G06F 9/45558 717/168 |
| 2012/0102291 A1* | 4/2012 | Cherian | ................ | G06F 9/5044 711/170 |
| 2013/0074066 A1* | 3/2013 | Sanzgiri | .................. | H04L 49/70 718/1 |
| 2014/0334495 A1* | 11/2014 | Stubberfield | ......... | H04L 49/354 370/401 |

(Continued)

*Primary Examiner* — Krisna Lim
(74) *Attorney, Agent, or Firm* — Patterson & Sheridan LLP (57) ABSTRACT

One or more examples provide a method of transferring a virtual machine between a virtualized computing system and a cloud computing system that includes: establishing connection between a first resource in the virtualized computing system and a second resource in the cloud computing system to transfer files that implement the virtual machine from the first resource to the second resource; accessing, for transmission over the connection, data blocks on a storage device in the virtualized computing system that include the files; executing at least one compliance check on each of the data blocks using at least one compliance checker; and preventing each of the data blocks that fails a compliance check from being maintained in the cloud computing system.

20 Claims, 4 Drawing Sheets

(56) References Cited

U.S. PATENT DOCUMENTS

2015/0169340 A1\* 6/2015 Haddad ............... G06F 9/45533
 718/1
2015/0172331 A1\* 6/2015 Raman .................. H04L 65/403
 709/204

\* cited by examiner

VIRTUAL MACHINE COMPLIANCE CHECKING IN CLOUD ENVIRONMENTS

CROSS-REFERENCE TO RELATED APPLICATIONS

This application claims priority to U.S. Provisional Application Ser. No. 62/063,264, filed Oct. 13, 2014, which is incorporated by reference herein in its entirety.

BACKGROUND

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks. One operation provided by some services is the transfer to the cloud system of VMs on existing computing resources managed by customers. Both the service provider and the customer perceive risks when uploading VMs to the cloud environment: the customer perceives the risk of potential loss of sensitive or private data, such as credit card data, personal health data, and the like. The service provider perceives the risk of running VMs that contain sensitive data in violation of laws, rules, and regulations, that are unsecure, that are running inauthentic software licensing, and that can potentially compromise the cloud system.

SUMMARY

One or more embodiments provide techniques for virtual machine compliance checking in cloud environments. In an embodiment, a method of transferring a virtual machine between a virtualized computing system and a cloud computing system includes: establishing connection between a first resource in the virtualized computing system and a second resource in the cloud computing system to transfer files that implement the virtual machine from the first resource to the second resource; accessing, for transmission over the connection, data blocks on a storage device in the virtualized computing system that include the files; executing at least one compliance check on each of the data blocks using at least one compliance checker; and preventing each of the data blocks that fails a compliance check from being maintained in the cloud computing system.

Further embodiments include a non-transitory computer-readable storage medium comprising instructions that cause a computer system to carry out the above method above, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
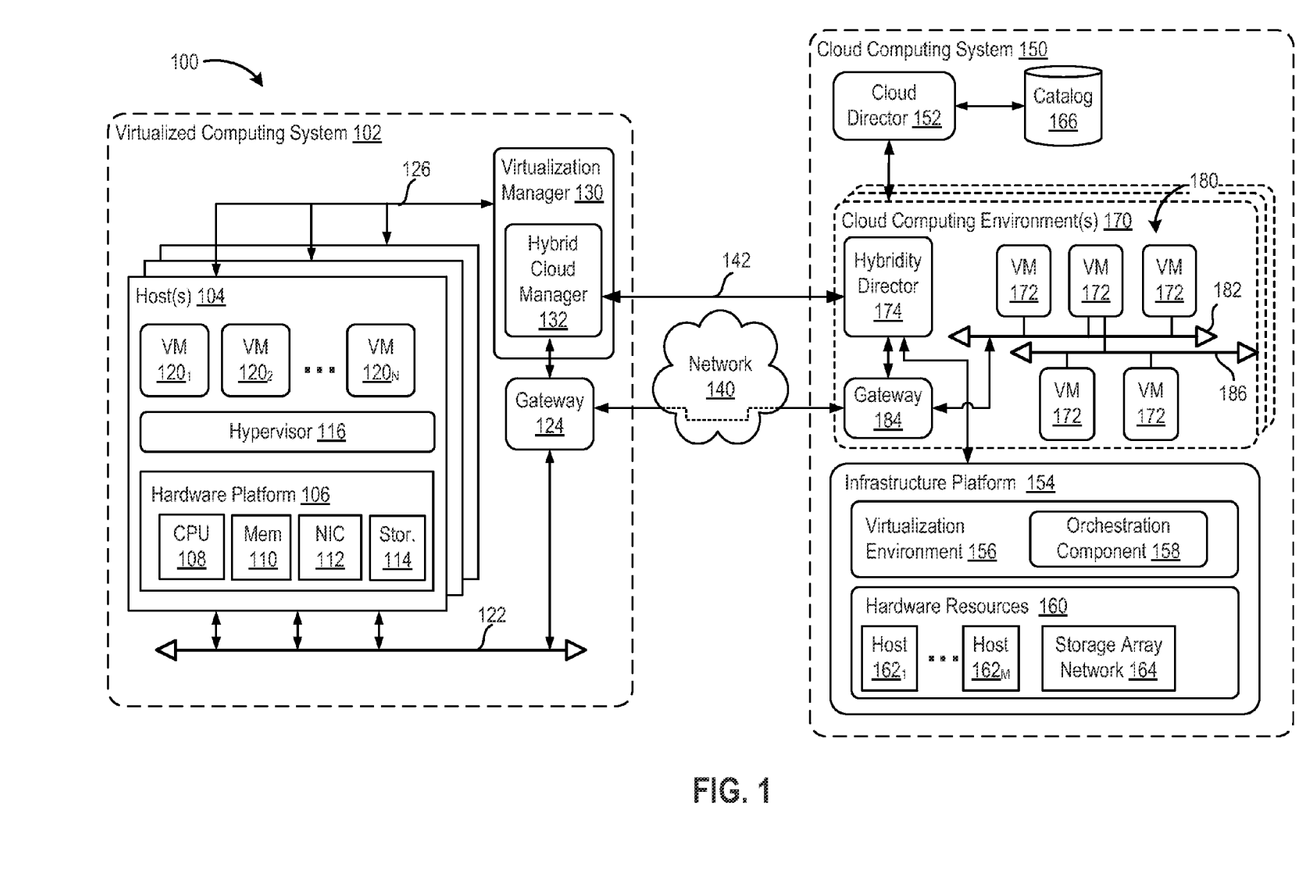
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware® ESXi™ hypervisor provided as part of the VMware® vSphere® solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity directory 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Figure 2:
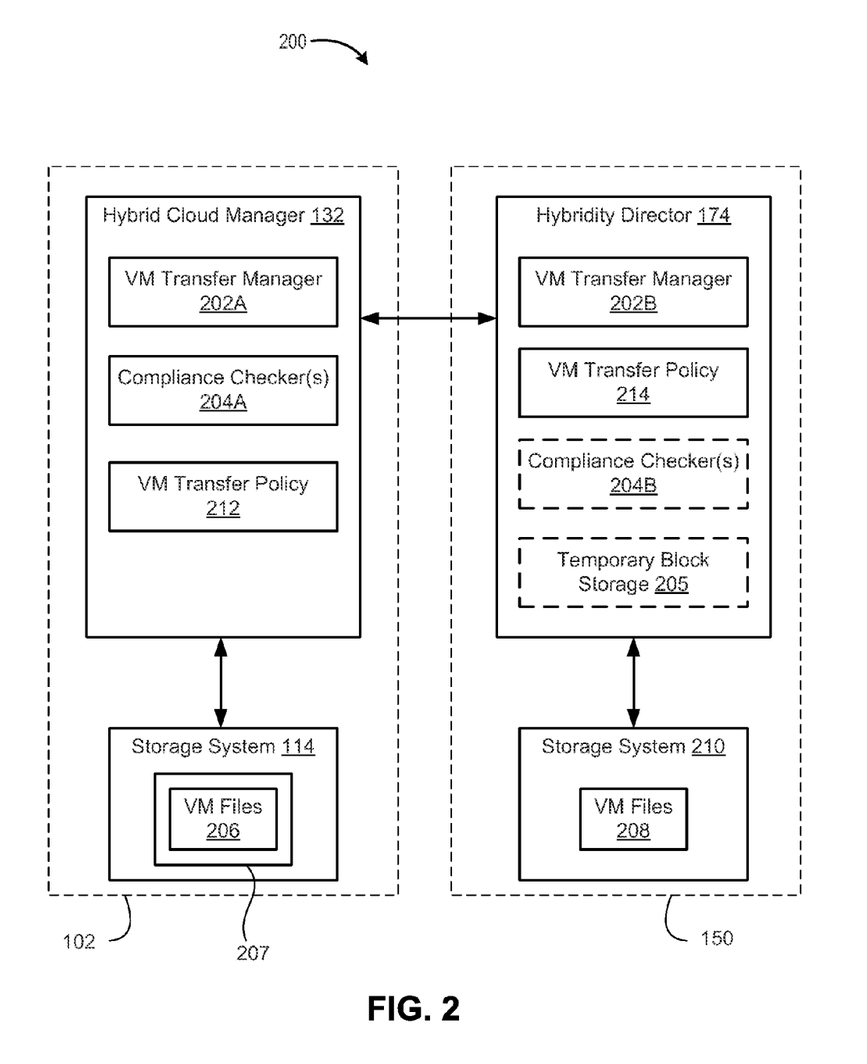
FIG. 2 is a block diagram showing an example of a system for transferring virtual machines between a virtualized computing system and a cloud computing system.

FIG. 2 is a block diagram showing an example of a system 200 for transferring virtual machines between a virtualized computing system and a cloud computing system. System 200 includes a first resource in virtualized computing system 102 connected to a second resource in cloud computing system 150. In the example shown, the first resource comprises hybrid cloud manager 132 and the second resource comprises hybridity director 174. The connection between hybrid cloud manager 132 and hybridity director 174 can be made over direct connection 142 or through network 140 using gateways 124, 184. In one or more embodiments, the connection between hybrid cloud manager 132 and hybridity director 174 may be a trusted connection established using identity verification and encryption techniques known to those skilled in the art.

In an example, hybrid cloud manager 132 includes a VM transfer manager 202A and one or more compliance checkers (compliance checker(s) 204A). Hybridity director 174 includes a VM transfer manager 202B. VM transfer manager 202A cooperates with VM transfer manager 202B to transfer VM(s) between virtualized computing system 102 and cloud computing system 150. Hybrid cloud manager 132 can access VM files 206 stored in storage system 114. VM files 206 include files that implement VMs 120 in virtualized computing system 102. A given VM can be implemented by a set of files, which can include configuration file(s), virtual disk file(s), virtual disk delta file(s) and configuration file(s) associated with VM snapshot(s), basic input output system (BIOS) file(s), log file(s), and the like. VM transfer manager 202A can access VM files 206 in order to transfer a VM. Hybridity director 174 can access a storage system 210 in cloud computing system 150 (e.g., storage array network 164). VM transfer manager 202B can store VM files 208 in storage system 210. VM files 208 implement VM(s) that have been transferred from virtualized computing system 102.

In operation, a user can interact with virtualization manager 130, hybrid cloud manager 132, or both to request transfer of a selected VM from virtualized computing system 102 to cloud computing system 150. Hybrid cloud manager 132 invokes VM transfer manager 202A to begin the transfer of the selected VM. VM transfer manager 202A accesses data blocks 207 on storage system 114 that include VM files corresponding to the selected VM. Data blocks 207 can be logical blocks of a file system or physical blocks of underlying storage system 114. Alternatively, data blocks 207 can be independent of the file system and storage system 114, where each block includes a sequence of bits or bytes comprising file(s) of VM files 206, or a portion of a file of VM files 206 (e.g., a portion of a virtual disk file). VM transfer manager 202A cooperates with VM transfer manager 204B to transfer VM files for the selected VM in groups of sequential groups of data blocks 207, where each group comprises one or more of data blocks 207.

In an example, before transferring data block(s) over the connection to VM transfer manager 202B, VM transfer manager 202A invokes compliance checker(s) 204A. Each of compliance checker(s) 204A process data block(s) to perform a compliance check. A compliance check generally comprises searching the subject data block(s) for indication(s), satisfying some level of confidence, of specific type(s) of data considered to be non-compliant with a VM transfer policy or VM transfer policies. For example, an administrator of virtualized computing system 102 can establish a VM transfer policy 212, which can be maintained by hybrid cloud manager 132, and which dictates type(s) of data ineligible for transfer to cloud computing system 150. An administrator of clouding computing system 150 can establish a VM transfer policy 214, which can be maintained by hybridity director 174, and which dictates type(s) of data ineligible for transfer to cloud computing system 150. In another example, both VM transfer policy 212 and VM transfer policy 214 can be established. Hybrid cloud manager 132 can obtain VM transfer policy 214 from hybridity director 174, and hybridity director 174 can obtain VM transfer policy 212 from hybrid cloud manager 132.

Example compliance checks include checking for financial data (financial data check), checking for human health data (human health data check), checking for unlicensed software (software licensing check), checking for malicious software (malicious software check), and checking for software vulnerabilities (software vulnerability check). Financial data can include, for example, bank account numbers, credit card numbers, financial transaction information, and like type of confidential financial information. Human health data can include, for example, patient records or other types of individually identifiable health information. Malicious software can include computer viruses, worms, malware, and the like. Software vulnerabilities can include un-patched operating system files, applications, and the like. In some examples, compliance checks can check for data designated by law, regulation, rule, etc., established by governments, standards bodies, etc., as being confidential, proprietary, etc. and subject to specific handling rules. For example, the Payment Card Industry (PCI) Data Security Standard (DSS) defines specific financial data (e.g., credit card information) as being subject to specific handling requirements. The Health Insurance Portability and Accountability Act of 1996 (HIPAA) includes a set of laws enacted in the United States that defines specific electronic health data as being subject to specific handling requirements.

VM transfer policy 212, VM transfer policy 214, or both can define one or more compliance checks to be performed during each VM transfer. In an example, compliance checker(s) 204A check data block(s) before such data block(s) are transferred to cloud computing system 150. Compliance checker(s) 204A notify VM transfer manager 202A of data block(s) that fail a compliance check. VM transfer manager 202A, VM transfer manager 202B, or both can take one or more actions, discussed below, in response to failure of a compliance check performed by compliance checker(s) 204A. The action(s) to be taken can be defined by VM transfer policy 212, VM transfer policy 214, or both.

In another example, compliance check(s) can be performed by compliance checker(s) 204B in hybridity director 174. VM transfer manager 202A can transfer each data block associated with the selected VM, and VM transfer manager 202B can invoke compliance checker(s) 204B to perform compliance check(s) on data block(s). Compliance checker(s) 204B can notify VM transfer manager 202B of any data block(s) that fail a compliance check. In still another example, compliance checks can be performed by both hybrid cloud manager 132 and hybridity director 174. That is, both compliance checker(s) 204A and compliance checker(s) 204B can perform compliance check(s). Compliance checker(s) 204A can perform different compliance check(s) than compliance checker(s) 204B. One or more compliance checks can be performed by both compliance checker(s) 204A and compliance checker(s) 204B (e.g., redundant compliance checks). This will allow the compliance check criteria to be updated, such as antivirus signatures on the cloud-side as a service.

In general, VM transfer manager 202A, VM transfer manager 202B, or both prevent each of the data blocks that fails a compliance check from being maintained in cloud computing system 150. In an example, VM transfer manager 202A can terminate transfer of the selected VM to cloud computing system 150 in response to notification of failed compliance check(s) received from compliance checker(s) 204A. VM transfer manager 202A can notify VM transfer manager 202B of the termination. In response to the notification, VM transfer manager 202B can discard any data block(s) received during the transfer. VM transfer manager 202B can notify VM transfer manager 202A of failed compliance check(s) indicated by compliance checker(s) 204B. In response to the notification, VM transfer manager 202A can terminate the transfer of the selected VM and VM transfer manager 202B can discard any data block(s) received during the transfer. Accordingly, embodiments of the present disclosure can preemptively perform compliance checks of migrating VM files without having to first transfer all data blocks (e.g., the entirety of the VM files) to the cloud computing system, which might otherwise waste network bandwidth and network resources.

In another example, rather than terminating the transfer of the selected VM, VM transfer manager 202A can continue transferring data blocks that satisfy the compliance check(s). VM transfer manager 202B can keep data blocks that satisfy the compliance check(s) rather than discarding the data blocks. VM transfer manager 202B can store the data blocks in storage system 210 to add files of the transferred VM to VM files 208. The VM files of the transferred VM have all data except for the data that failed the compliance check(s).

In an example, hybridity director 174 can establish a temporary block storage 205, which can be implemented on an accessible storage device (e.g., memory in a host having hybridity director 174 or a storage device in a host having hybridity director 174 or otherwise accessible by such host). VM transfer manager 202B can cache data blocks in temporary block storage 205 during transfer of a selected VM.

VM transfer manager 202B can discard data blocks in temporary block storage 205 in response to an instruction to do so from VM transfer manager 202A. If compliance checker(s) 204B are used, VM transfer manager 202B can discard data block(s) that failed a compliance check from temporary block storage 205. In this manner, data block(s) that fail a compliance check are prevented from being stored in storage system 210 or otherwise being used to implement a virtual machine in cloud computing system 150. In response to a completed transfer, VM transfer manager 202B can flush data blocks in temporary block storage 205 to storage system 210 to add files for the selected VM to VM files 208. In another example, temporary block storage 205 can be omitted, and VM transfer manager 202B can store data blocks directly to storage system 210. VM transfer manager 202B can delete data blocks from storage system 210 in case of an instruction to do so from VM transfer manager 202A or in case data block(s) fail a compliance check as indicated by compliance checker(s) 204B.

While hybrid cloud manager 132 is described as having VM transfer manager 202A and compliance checker(s) 204A, hybrid cloud manager 132 can have other configurations. In general, the operations performed by VM transfer manager 202A and compliance checker(s) 204A can be performed by one or more modules implemented within hybrid could manager 132, each of which can include hardware, software, firmware, or a combination thereof. Likewise, while hybridity director 174 is described as having VM transfer manager 202B and compliance checker(s) 20B, hybridity director 174 can have other configurations. In general, the operations performed by VM transfer manager 202B and compliance checker(s) 204B can be performed by one or more modules implemented within hybridity director 174, each of which can include hardware, software, firmware, or a combination thereof.

Figure 3:
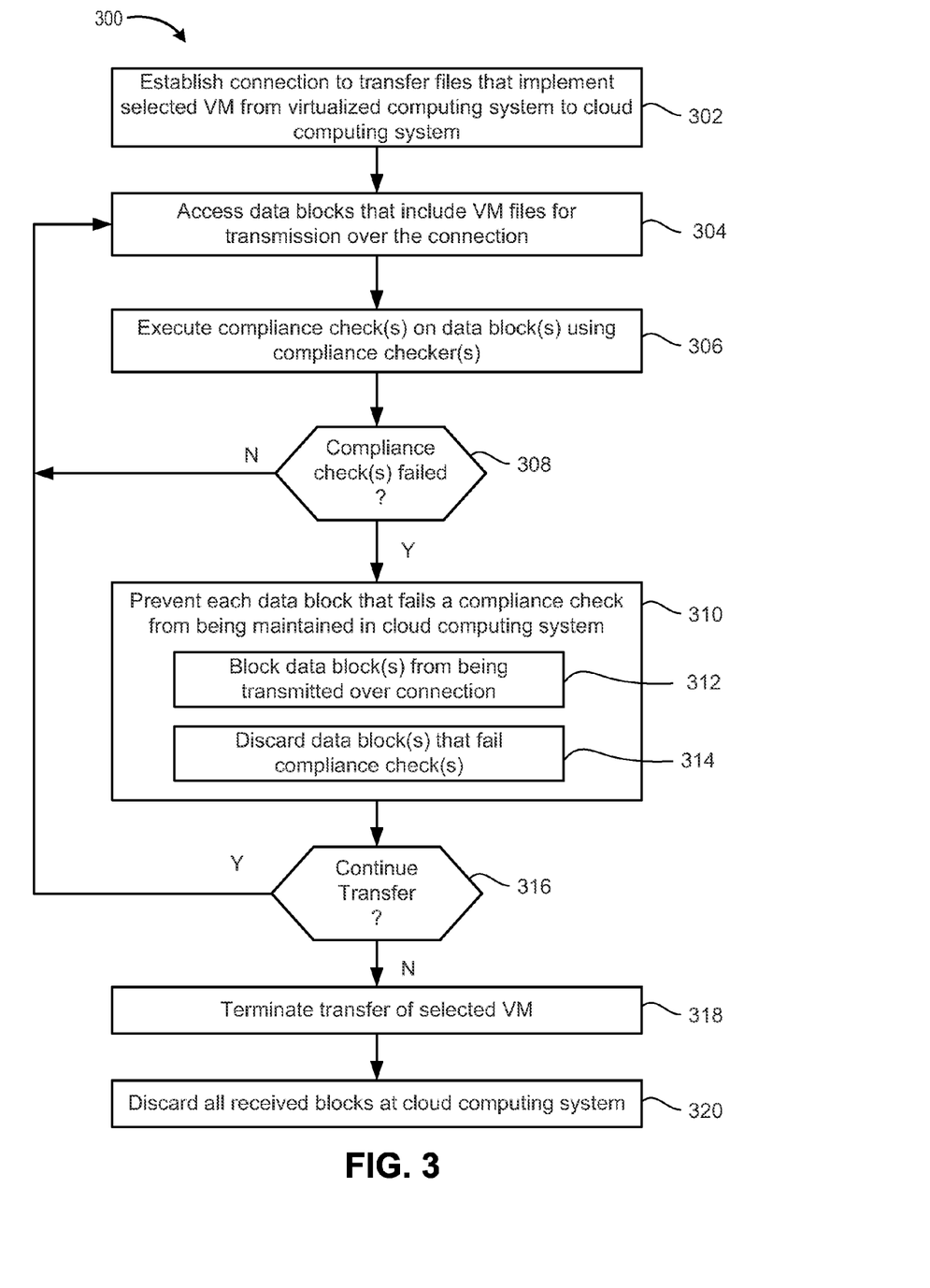
FIG. 3 is a flow diagram showing an example of a method of transferring a virtual machine between a virtualized computing system and a cloud computing system.

FIG. 3 is a flow diagram showing an example of a method 300 of transferring a virtual machine between a virtualized computing system and a cloud computing system. The method 300 begins at step 302, where hybrid cloud manager 132 (first resource) establishes a connection to hybridity director 174 (second resource) to transfer files that implement a selected VM from virtualized computing system 102 to cloud computing system 150. At step 304, hybrid cloud manager 132 accesses, for transmission over the connection, data blocks on storage system 114 in virtualized computing system 102 that include VM files for the selected VM. At step 306, hybrid cloud manager 132, hybridity director 174, or both execute at least one compliance check on data block(s) using at least one compliance checker (e.g., compliance checker(s) 204A, compliance checker(s) 204B, or both).

At step 308, hybrid cloud manager 132, hybridity director 174, or both determine whether data block(s) fail compliance check(s). Compliance checks can be performed on one data block at a time, or on a plurality of data blocks at a time. If the data block(s) pass the compliance check(s), method 300 returns to step 304. If the data block(s) fail a compliance check, method 300 proceeds to step 310. Otherwise, hybrid cloud manager 132 may proceed to transmit the particular set of data block(s) to hybridity director 174 at cloud computing system 150. At step 310, hybrid cloud manager 132, hybridity director 174, or both prevent each of the data blocks that fails a compliance check from being maintained in cloud computing system 150. For example, at step 312, hybrid cloud manager 132 can block data block(s) that fail compliance check(s) from being transmitted over the connection. At step 314, hybridity director 174 can discard data block(s) that fail compliance check(s).

At step 316, hybrid cloud manager 132 can determine whether to continue with the transfer. If so, method 300 returns to step 304. Accordingly, VM transfer manager 202A may validate the integrity of a migrating VM in a streaming fashion, i.e., by checking and transferring data blocks 207 in chunks of data block(s) at a time. Otherwise, method 300 proceeds to step 318. At step 318, hybrid cloud manager 132 terminates transfer of the selected VM. At step 320, hybridity director 174 can discard all received data blocks. In an example, the decision at step 316 to continue the transfer operation can be based on the VM policy 212, the VM policy 214, or both. In another example, the decision at step 316 can be omitted and method 300 can either always terminate the transfer or always return to step 304 and continue with the transfer.

Figure 4:
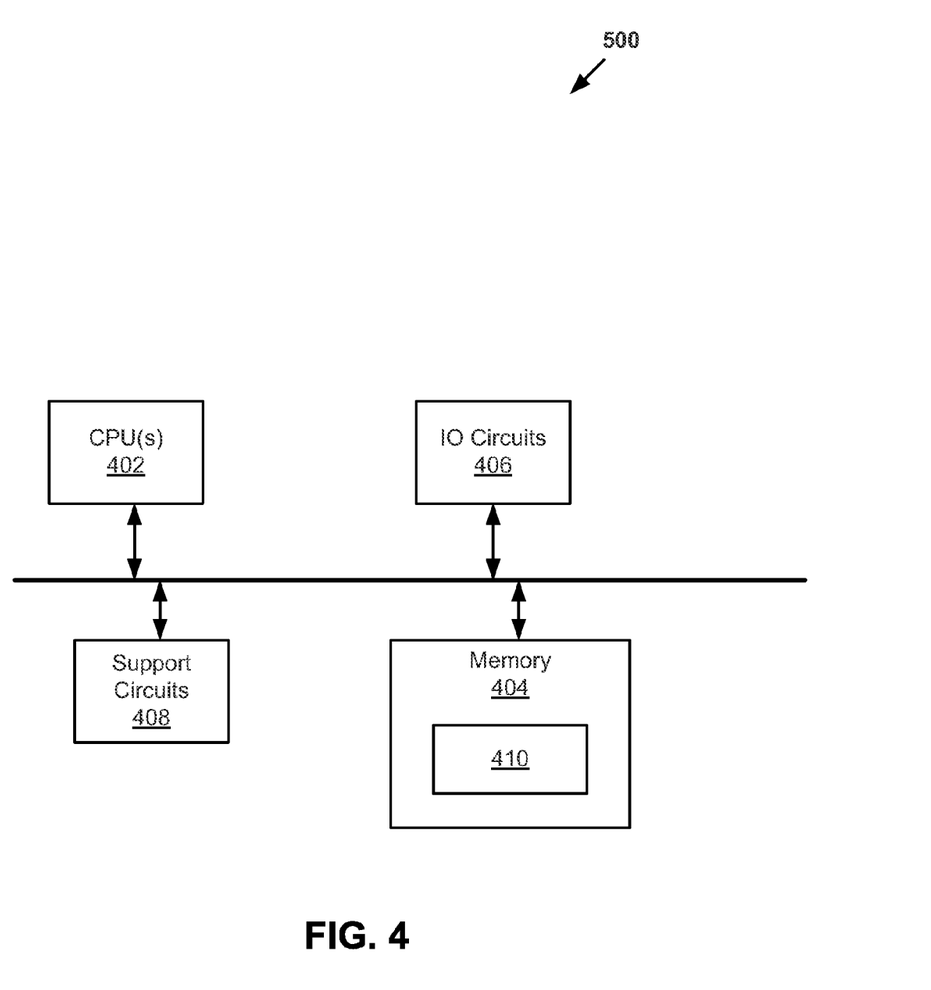
FIG. 4 is a block diagram depicting an example of a computer system in which one or more embodiments of the present disclosure may be utilized.

FIG. 4 is a block diagram depicting an example of a computer system 400 in which one or more embodiments of the present disclosure may be utilized. Computer system 400 can be used as a host to implement hybrid cloud manager 132 or hybridity director 174. Computer system 400 includes one or more central processing units (CPUs) 402, memory 404, input/output (JO) circuits 406, and various support circuits 408. Each of CPUs 402 can include any microprocessor known in the art and can execute instructions stored on computer readable storage, such as memory 404. Memory 404 can include various volatile and/or non-volatile memory devices, such as random access memory (RAM), read only memory (ROM), and the like. Instructions and data 410 for performing the various methods and techniques described above can be stored in memory 404 for execution by CPUs 402. That is, memory 404 can store instructions executable by CPUs 402 to perform method 300. Support circuits 408 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of transferring a virtual machine between a virtualized computing system and a cloud computing system, the method comprising:
    determining connection between a first resource in the virtualized computing system and a second resource in the cloud computing system to transfer files that implement the virtual machine from the first resource to the second resource;
    accessing, for transmission over the connection, data blocks on a storage device in the virtualized computing system that include the files;
    executing at least one compliance check on each of the data blocks using at least one compliance checker; and
    preventing each of the data blocks that fails a compliance check from being maintained in the cloud computing system.

2. The method of claim 1, wherein the executing the at least one compliance check on each of the data blocks using at least one compliance checker is performed by the first resource in the virtualized computing system, and
    wherein the preventing each of the data blocks that fails the compliance check from being maintained in the cloud computing system comprises the first resource blocking each of the data blocks that fails a compliance check from being transmitted over the connection.

3. The method of claim 1, wherein the executing the at least one compliance check on each of the data blocks using at least one compliance checker is performed by the second resource in the cloud computing system, and
    wherein the preventing each of the data blocks that fails the compliance check from being maintained in the cloud computing system comprises the second resource discarding each of the data blocks that fails a compliance check.

4. The method of claim 1, wherein the executing the at least one compliance check on each of the data blocks using at least one compliance checker is performed partially by the first resource in the virtualized computing system and partially by the second resource in the cloud computing system, and wherein the preventing each of the data blocks that fails the compliance check from being maintained in the cloud computing system comprises the first resource blocking each of the data blocks that fails a compliance check performed at the first resource from being transmitted over the connection and the second resource discarding each of the data blocks that fails a compliance check performed at the second resource.

5. The method of claim 1, wherein the at least one compliance check comprises at least one of a financial data check, a human health data check, a software licensing check, a malicious software check, or a software vulnerability check.

6. The method of claim 1, wherein the executing the at least one compliance check on each of the data blocks using at least one compliance checker is performed on each of the data blocks as each of the data blocks is accessed from the storage device in the virtualized computing system at the first resource or received at the second resource in the cloud computing system.

7. The method of claim 1, wherein the executing the at least one compliance check on each of the data blocks using at least one compliance checker is performed on at least one plurality of the data blocks as a group as the at least one plurality of the data blocks is accessed from the storage device in the virtualized computing system at the first resource or received at the second resource in the cloud computing system.

8. The method of claim 1, wherein the preventing each of the data blocks that fails a compliance check from being maintained in the cloud computing system comprises at least one of:
    blocking transmission of each of the data blocks that fails a compliance check over the connection; or
    blocking each of the data blocks that fails a compliance check at the second resource from being stored in a resource of the cloud computing system other than the second resource and discarding each of the data blocks that fails a compliance check at the second resource.

9. The method of claim 1, further comprising:
terminating the step of accessing the data blocks on the storage device for transmission over the connection in response to at least one of the data blocks failing a compliance check.

10. The method of claim 1, further comprising:
transmitting each of the data blocks that passes the at least one compliance check over the connection; and
storing each of the data blocks that passes the at least one compliance check in another storage device in the cloud computing system.

11. A computer system, comprising:
a memory configured to store code; and
a processor configured to execute the code to:
establish connection to a resource to transfer files that implement a virtual machine from a virtualized computing system to a cloud computing system;
obtain data blocks on a storage device in the virtualized computing system that include the files;
perform at least one compliance check on each of the data blocks using at least one compliance checker; and
prevent each of the data blocks that fails a compliance check from being maintained in the cloud computing system.

12. The computer system of claim 11, wherein the at least one compliance check comprises at least one of a financial data check, a human health data check, a software licensing check, a malicious software check, or a software vulnerability check.

13. The computer system of claim 11, wherein the processor executes the code to perform the at least one compliance check on each of the data blocks as each of the data blocks is obtained from the storage device in the virtualized computing system.

14. The computer system of claim 11, wherein the processor executes the code to perform the at least one compliance check on at least one plurality of the data blocks as a group as the at least one plurality of the data blocks is accessed from the storage device in the virtualized computing system.

15. The computer system of claim 11, wherein the processor executes the code to prevent each of the data blocks that fails a compliance check from being maintained in the cloud computing system by blocking transmission of each of the data blocks that fails a compliance check over the connection.

16. The non-transitory computer readable medium of claim 11, wherein the performing the at least one compliance check on each of the data blocks using at least one compliance checker is performed on at least one plurality of the data blocks as a group as the at least one plurality of the data blocks is accessed from the storage device in the virtualized computing system.

17. The non-transitory computer readable medium of claim 11, wherein the preventing each of the data blocks that fails a compliance check from being maintained in the cloud computing system includes blocking transmission of each of the data blocks that fails a compliance check over the connection.

18. A non-transitory computer readable medium comprising instructions, which when executed in a computer system, causes the computer system to carry out a method of transferring a virtual machine between resources within a hybrid cloud environment having a virtualized computing system and a cloud computing system, the method comprising:
establishing connection to a resource to transfer files that implement a virtual machine from a virtualized computing system to a cloud computing system;
obtaining data blocks on a storage device in the virtualized computing system that include the files;
performing at least one compliance check on each of the data blocks using at least one compliance checker; and
preventing each of the data blocks that fails a compliance check from being maintained in the cloud computing system.

19. The non-transitory computer readable medium of claim 18, wherein the at least one compliance check comprises at least one of a financial data check, a human health data check, a software licensing check, a malicious software check, or a software vulnerability check.

20. The non-transitory computer readable medium of claim 18, wherein the performing the at least one compliance check on each of the data blocks using at least one compliance checker is performed on each of the data blocks as each of the data blocks is obtained from the storage device in the virtualized computing system.

* * * * *